F. W. FEE.
COASTER BRAKE.
APPLICATION FILED MAR. 23, 1908.
951,880.
Patented Mar. 15, 1910.
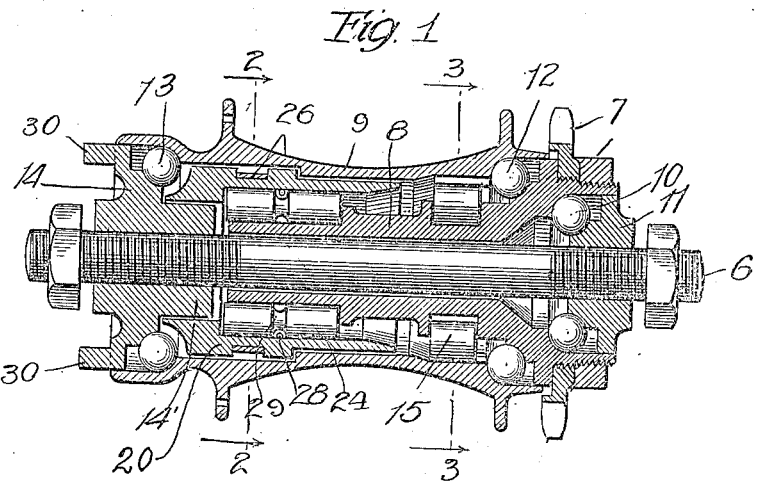
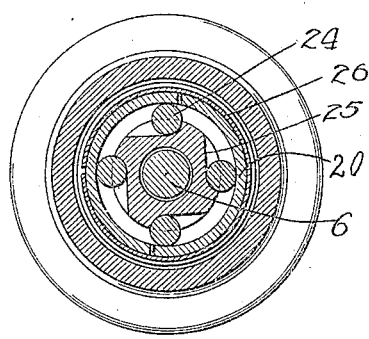
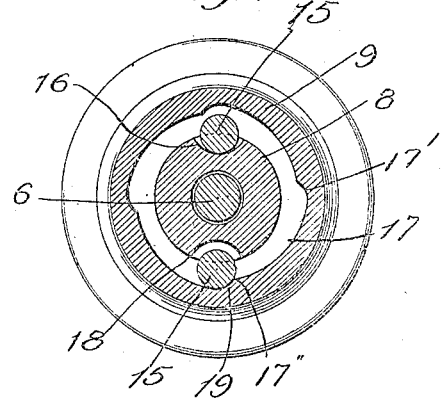
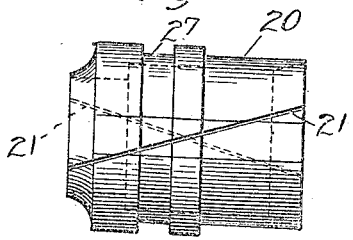
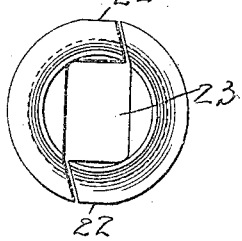
Witnesses
Harry R. L. White
M. A. Kiddie
Inventor
Fred W. Fee
By Wm. B. Belt Atty.

UNITED STATES PATENT OFFICE.

FRED W. FEE, OF CHICAGO, ILLINOIS, ASSIGNOR OF ONE-HALF TO SAMUEL F. KLOHS, OF CHICAGO, ILLINOIS.

COASTER-BRAKE.

951,880.  Specification of Letters Patent.  Patented Mar. 15, 1910.

Application filed March 23, 1908. Serial No. 422,591.

*To all whom it may concern:*

Be it known that I, FRED W. FEE, a citizen of the United States, residing at Chicago, in the county of Cook and State of Illinois, have invented new and useful Improvements in Coaster-Brakes, of which the following is a specification.

My invention relates to coaster brakes which are largely used in the hub of the rear wheel of a bicycle and are designed to be controlled by the rider for the purpose of rotating the wheel and propelling the bicycle forwardly, or to permit the wheel to revolve freely forward or backward, or to brake the wheel and retard or check the movement of the bicycle.

The object of the invention is to provide a coaster brake of simple and inexpensive construction, comprising but few parts which are constructed and arranged and combined in a novel and efficient manner to reduce the wear to a minimum and prolong the life of the device.

In the accompanying drawings illustrating my invention Figure 1 is a sectional view of a bicycle wheel hub having the invention embodied therein. Fig. 2 is a transverse sectional view through the brake rollers on the line 2—2 of Fig. 1. Fig. 3 is a transverse sectional view through the driving rollers on the line 3—3 of Fig. 1. Fig. 4 is a plan view and Fig. 5 is an end view of the brake sleeve.

Referring to the drawings, 6 is the axle which is mounted rigidly in the frame of the bicycle in any suitable manner. A driving sprocket wheel 7 is mounted on a driver 8 which is arranged within the shell 9 of the hub and bored to receive the axle 6. A ball bearing 10 is provided between the driver 8 and a cone 11 screw-threaded on the axle; a ball bearing 12 is provided between the shell 9 and the driver 8, and a ball bearing 13 is provided between the shell 9 and the cone 14 screw-threaded on the other end of the axle. The driving sprocket, the driver and shell are arranged to rotate on the axle and the cones 11, 14, as shown in Fig. 1, or in any other suitable manner.

The driver 8 is locked to the shell 9 to rotate the latter by rollers 15 which are pinched between the driver and shell on the forward movement of the former to effect locking engagement between these parts. Pockets 16 are provided in the driver between its ends to receive and hold or carry the rollers in a substantially constant relation to the driver and these pockets are circular in form and somewhat wider than the rollers and approximately half as deep so that the rollers are permitted a limited amount of play in the pockets in the driver. Recesses 17 are provided on the inner surface of the shell opposite that part of the driver carrying the rollers 15 and these recesses are elongated and formed eccentrically, being deeper at the forward end 17′ than at the rear end 17″. In the drawings I have shown two rollers 15 located on diametrically opposite sides of the driver and provision is made for permitting the rollers to drop by gravity into position to be pinched between the driver at the edge 18 of the pocket 16 and the shoulder 19 at the forward end of a recess 17 in the shell. In the initial movement of the driver (Fig. 3) the lower roller only will be locked between the driver and the shell and the other roller will not be locked until it falls by gravity into engagement with the shell and is carried against the shoulder of the adjacent recess in the shell. After the rollers are once locked with the shell they will remain so until released in the manner hereafter described. While I have only shown two rollers it will be apparent that one roller, one pocket and one recess, or more than one may be used within the purview of my invention, but I prefer the arrangement shown in the drawings.

The brake device comprises a brake sleeve 20, (Figs. 4, 5), the outer periphery of which is made to the same radius as the inner periphery of the hub shell where it fits in the shell. The brake sleeve is divided preferably into two parts or shoes by oppositely directed cuts 21 and flattened at 22 adjacent to each cut. I divide and flatten this brake sleeve in this way to permit the hub shell 9 to revolve freely around the sleeve without friction while the wheel is being rotated forward or backward and at the same time I do not change the radii of the sleeve except at the flattened parts 22, thereby providing for a perfect frictional contact between the sleeve and the inner periphery of the hub shell over a substantially correlative area. The dividing cuts are made inclined at an angle to the axis of the brake sleeve so these cuts will not be parallel with the axis of rollers 24, thus preventing the latter from falling into the grooves between the brake shoes. The brake sleeve has a rectangular opening 23 in one end to receive a complementary projection 14' on the cone 14 whereby to prevent the brake sleeve from turning with the shell and driver. The brake sleeve is expanded or forced into frictional engagement with the hub shell by rollers 24 which are arranged between the driver and the brake sleeve (Fig. 2). The driver has recesses 25 on its surface in which the rollers play. These recesses are made cam shaped in effect so that when the bicycle is being propelled forward the rollers will turn freely in the deepest part of the recesses without affecting the brake shoes. When the rider back-pedals the movement of the driver is reversed and the rollers 24 will be carried along to the shallow part of the recesses and be wedged between the driver and the brake shoes to expand the brake shoes and cause them to impinge against the shell and produce the desired braking effect to retard or check the movement of the bicycle.

I prefer to employ a divided spring band 26 which is seated in a peripheral groove 27 in the outer surface of the brake shoes to facilitate assembling these parts. This spring band will also hold the shoes together and away from the shell until the rider back pedals to secure the braking effect, and this avoids any retardation of the rotation of the shell by frictional engagement of the brake shoes with the shell until the braking effect is desired. A wire spring ring 28 may be employed in assembling the rollers 26 on the driver, and this spring will not interfere with the operation of the rollers because it is seated in peripheral grooves 29 therein.

The cone 14 is provided with lugs 30 (Fig. 1) which project outwardly above and below the frame to engage the same and prevent the cone from turning.

In practice power is transmitted through the driver wheel, the driver and the rollers 15 to turn the hub, the driver turning on the ball bearing 10 and the shell of the hub being locked to the driver by the rollers 15 and turning on the ball bearing 13 and with the driver on the ball bearing 10. When the rider desires to coast he will hold the pedals and the driving wheel stationary, and the rollers 15 will be released from pinching engagement between the driver and the shell to permit the hub to revolve freely. If the rider back-pedals the rollers 15 will be released, as before described, and the rollers 24 will be moved along in the recesses to press the brake sleeve outward into engagement with the shell and thus produce the desired braking effect. The two parts or sections of the brake sleeve constitute brake shoes for braking the wheel and retarding or checking the movement of the bicycle.

The invention comprises a comparatively few parts which are constructed in a strong and substantial manner and are arranged and combined so as to reduce wear to a minimum and avoid the liability of becoming jammed or stuck or otherwise thrown out of working order. The device does not depend in any way upon the use of springs for its successful operation as it will be understood that the spring 26 and spring 28 are primarily to facilitate the assembling of parts and may be used or dispensed with as seen fit.

While I have described my invention as particularly applicable to bicycles I do not intend thereby to limit the scope of the invention to this particular application but on the contrary reserve the right to apply and adapt it to any vehicle when it can be used.

What I claim and desire to secure by Letters Patent is:

1. In a coaster brake the combination of an elongated driver member having adjacent one end a pocket and adjacent its other end an inclined recess, a shell on the driver, the shell having an inclined recess arranged adjacent said pocket, a brake sleeve within the shell at a point adjacent the recess of the driver, a roller interposed between the inclined recess of the shell and the pocket of the driver, and an auxiliary roller interposed between the brake sleeve and the inclined recess of the driver, the parts being constructed and arranged whereby as movement is imparted to the driver in one direction one of said rollers will be rendered active and when movement is imparted in the opposite direction the other roller will be rendered active, for the purpose described.

2. In a coaster brake, the combination of an elongated driver, a shell on the driver, said driver having a pocket therein on its periphery, said shell having a plurality of elongated eccentric recesses interiorly arranged therein end to end, a shoulder at the forward end of each recess, a roller loosely seated in the pocket in the driver and adapted to be wedged between the driver and one of said shoulders to lock said driver and shell together, and braking means operatively connected with said driver at a point removed from said pockets.

3. In a coaster brake, the combination of a driver, a shell on the driver, said driver having a pocket therein on its periphery and said shell having a plurality of eccentric recesses interiorly arranged therein, a shoulder at the forward end of each recess, and rollers carried by the driver in the pockets therein, said pockets in the driver being formed substantially concentric with the rollers but of sufficient size to permit the rollers to have a limited sidewise play therein and said rollers being adapted to be wedged between the driver and one of said shoulders to lock the driver and shell together.

4. In a coaster brake, the combination of an elongated driver, a shell on the driver, said driver having a pocket therein on its periphery adjacent one end thereof and said shell having an eccentric recess interiorly arranged therein, a shoulder at the forward end of each recess, a roller carried by the driver loosely in the pocket therein and adapted to fall by gravity into position to be wedged between the driver and one of said shoulders to lock said driver and shell together, and braking means interposed between the shell and driver adjacent the opposite end thereof.

5. In a coaster brake, the combination of a driver, a shell on the driver, said driver having pockets therein on its periphery and said shell having elongated eccentric recesses interiorly arranged therein, rollers carried by the driver in the pockets therein and adapted to be wedged between the driver and the shell when the driver is turned forward to lock said parts together, a brake sleeve interposed between the shell and the driver and divided to form brake shoes, there being cam-shaped recesses on the driver within said brake sleeve, and rollers carried by the driver in said cam-shaped recesses and adapted to be pressed outwardly by the driver when the latter is turned backward to force the brake shoes into frictional engagement with the shell.

6. In a coaster brake, the combination of an axle, a hub shell on the axle, a cone on the axle, and outwardly projecting lugs on the cone to receive the frame of the vehicle therebetween and prevent the cone from turning.

FRED W. FEE.

Witnesses:
 Wm. O. Belt,
 M. A. Kiddie.